(12) United States Patent  (10) Patent No.: US 8,122,359 B2
Molander et al.  (45) Date of Patent: Feb. 21, 2012

(54) APPARATUS, SYSTEM, AND METHOD FOR TOPOLOGICAL DISPLAY OF USER INTERFACE ELEMENTS

(75) Inventors: Mark E. Molander, Cary, NC (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 11/758,272

(22) Filed: Jun. 5, 2007

(65) Prior Publication Data

US 2008/0307313 A1 Dec. 11, 2008

(51) Int. Cl.
*G06F 15/177* (2006.01)
(52) U.S. Cl. .................. 715/734; 715/810; 715/738
(58) Field of Classification Search .............. 715/734, 715/810, 738
See application file for complete search history.

(56) References Cited

U.S. PATENT DOCUMENTS

| | | | |
|---|---|---|---|
| 5,933,646 A | 8/1999 | Hendrickson et al. | 395/712 |
| 7,559,034 B1 * | 7/2009 | Paperny et al. | 715/803 |
| 7,665,027 B1 * | 2/2010 | Scalora et al. | 715/765 |
| 2003/0028881 A1 * | 2/2003 | Kazantsev et al. | 725/44 |
| 2003/0184580 A1 * | 10/2003 | Kodosky et al. | 345/734 |
| 2004/0056904 A1 * | 3/2004 | Jaeger | 345/853 |
| 2004/0059776 A1 | 3/2004 | Pitzel et al. | 709/203 |
| 2005/0132304 A1 * | 6/2005 | Guido et al. | 715/853 |
| 2006/0146368 A1 | 7/2006 | Uchida | 358/1.15 |
| 2006/0200803 A1 | 9/2006 | Neumann et al. | 717/120 |
| 2006/0212629 A1 | 9/2006 | Suzuki et al. | 710/104 |

FOREIGN PATENT DOCUMENTS

WO  WO 01/82082  6/2000

* cited by examiner

*Primary Examiner* — Michael Roswell
(74) *Attorney, Agent, or Firm* — Kunzler Needham Massey & Thorpe

(57) ABSTRACT

An apparatus, system, and method are disclosed for topological display of user interface elements. An input/output module receives the selection of a UIE. A topology display module displays a topology view of the selected UIE and a child UIE of the selected UIE. A relationship display module displays a modified navigation relationship indicator (NRI) for each navigation relationship between UIEs wherein at least one UIE in the navigation relationship comprises modified functionality, a new NRI for each navigation relationship between UIEs wherein at least one UIE in the navigation relationship comprises new functionality, and an existing NRI for each navigation relationship between UIEs wherein no UIE in the navigation relationship comprises modified functionality. The modified functionality may comprise plug-in functions and upgraded functions. The new functionality may comprise a new object.

17 Claims, 6 Drawing Sheets

APPARATUS, SYSTEM, AND METHOD FOR TOPOLOGICAL DISPLAY OF USER INTERFACE ELEMENTS

BACKGROUND OF THE INVENTION

1. Field of the Invention

This invention relates to a topological display and more particularly relates to a topological display of user interface elements.

2. Description of the Related Art

Management tools such as server management tools, data storage management tools, telecommunication network management tools, and the like often use a generic system console framework. The framework allows an operator to access standard functionality for a system. In addition, an original equipment manufacturer (OEM) and/or a third-party developer may also provide plug-ins, modified versions of a management tool, new versions of a management tool, and the like that work with the generic system console framework. Plug-ins, modified versions, new versions, and the like are referred to herein as modified functionality.

Modified functionality may add new tasks to a task navigation tree. In addition, the modified functionality may also add new items to existing menus. For example, in a server management tool, a new through-put plug-in may add a new resource monitor and a set of actions to perform if a monitor threshold is exceeded. No new tasks need be added. Instead, existing functions may be expanded. An operator who did not install the through-put plug-in may not easily find the expanded functions or even be aware of the installation of the expanded functions.

Topology viewers are often used to display functionality for a management system. For example, a topology viewer may show one or more objects, resources, menus, and the like. The topology viewer may also display modified functionality along with the previous functionality of the management system.

Unfortunately, a topology view may include numerous objects, resources, and menus. As a result, modified functionality may not be readily apparent. Continuing the example above, a topology view of the server management tool may display the through-put plug-in, but the operator may not easily discern the through-put plug-in's addition.

SUMMARY OF THE INVENTION

From the foregoing discussion, there is a need for an apparatus, system, and method for topological display of user interface elements (UIEs) modifications. Beneficially, such an apparatus, system, and method would enable topological display of modified UIEs.

The present invention has been developed in response to the present state of the art, and in particular, in response to the problems and needs in the art that have not yet been fully solved by currently available topological display methods. Accordingly, the present invention has been developed to provide an apparatus, system, and method for a topological display of UIEs that overcome many or all of the above-discussed shortcomings in the art.

The apparatus for topological display is provided with a plurality of modules configured to functionally execute the steps of displaying a topology view, receiving a selection, and displaying a modified navigation relationship indicator (NRI). Further, these modules execute the step of displaying a topology toolbar. These modules in the described embodiments include an input/output (I/O) module, a topology display module, and a relationship display module. Further, these modules may include a toolbar module.

The I/O module receives the selection of the UIE. The topology display module displays the topology view of the selected UIE and child UIEs of the selected UIE. The relationship display module displays a modified navigation relationship indicator (NRI) for each navigation relationship between UIEs wherein at least one UIE in the navigation relationship comprises modified functionality, a new NRI for each navigation relationship between UIEs wherein at least one UIE in the navigation relationship comprises new functionality, and an existing NRI for each navigation relationship between UIEs wherein no UIE in the navigation relationship comprises modified and new functionality. The modified functionality may be selected from plug-in functions and upgraded functions.

In an embodiment, the toolbar module displays the topology toolbar comprising a plurality of UIE categories. The I/O module may further receive a selection of at least one UIE category. The topology display module may further display the topology view of the selected UIE with the child UIEs of the selected UIE that satisfy the at least one selected UIE category.

Further, in an embodiment, the topology display module displays a navigation tree of UIEs, displays an indicator adjacent to each modified UIE, and displays a list of related UIEs in response to pointer indication directed to the indicator. In an embodiment, the pointer indication is selected from a pointer selection and a pointer hover.

A system of the present invention is also presented for topological display. The system may be embodied in a generic system console framework. In particular, the system, in one embodiment, includes a memory module and a processor module. The processor module may include an I/O module, a topology display module, a relationship display module, and a toolbar module. The memory module stores software instructions. The processor module may execute the software instructions.

The I/O module of the processor module receives the selection of the UIE. The topology display module displays the topology view of the selected UIE and child UIEs of the selected UIE. The relationship display module displays a modified NRI, a new NRI, and an existing NRI. The toolbar module displays a topology toolbar comprising a plurality of UIE categories.

In an embodiment, the I/O module further receives a selection of at least one UIE category. The topology display module may further display the topology view of the selected UIE with the child UIEs of the selected UIE that satisfy the at least one selected UIE category. Further, in another embodiment, the topology display module displays a navigation tree, displays an indicator, and displays a list.

A method of the present invention is also presented for topological display. The method in the disclosed embodiments substantially includes the steps to carry out the functions presented above with respect to the operation of the described apparatus and system. In one embodiment, the method includes displaying a topology view, receiving a selection, and displaying a modified NRI. In another embodiment, the method includes displaying a topology toolbar.

An I/O module receives the selection of a UIE. A topology display module displays a topology view of the selected UIE and a child UIE of the selected UIE. A relationship display module displays a modified NRI for each navigation relationship between UIEs wherein at least one UIE in the navigation relationship comprises modified functionality, a new NRI for each navigation relationship between UIEs wherein at least one UIE in the navigation relation ship comprises new functionality, and an existing NRI for each navigation relation slip between UIEs wherein no UIE in the navigation relationship comprises modified and new functionality.

In an embodiment, the modified functionality comprises plug-in functions The modified functionality may also comprise upgraded functions. In an embodiment, the new functionality comprises a new object. Thus the method enables efficient and complete topological display of UIEs for modified functionality.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, a system, and a method for topological display. Beneficially, such an apparatus, a system, and a method would allow topology viewers to display modified and new functionality for the management system. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
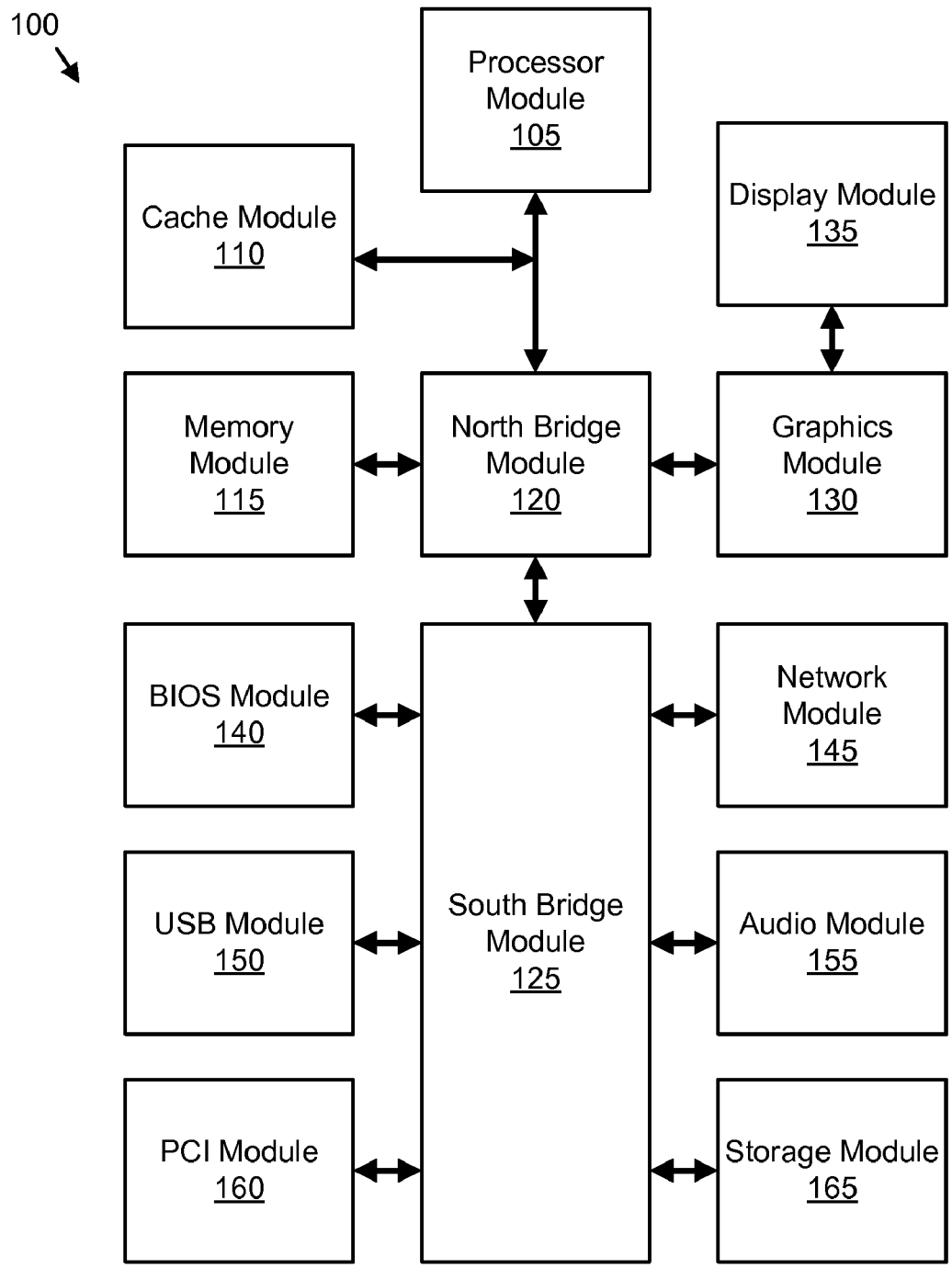
FIG. 1 is a schematic block diagram illustrating one embodiment of a computer in accordance with the present invention.

FIG. 1 depicts a schematic block diagram illustrating one embodiment of a computer 100 in accordance with the present invention. The computer 100 includes a processor module 105, a cache module 110, a memory module 115, a north bridge module 120, a south bridge module 125, a graphics module 130, a display module 135, a BIOS module 140, a network module 145, a Universal Serial Bus (USB) module 150, an audio module 155, a Peripheral Component Interconnect (PCI) module 160, and a storage module 165.

Although for simplicity, one processor module 105, one cache module 110, one memory module 115, one north bridge module 120, one south bridge module 125, one graphics module 130, one display module 135, one BIOS module 140, one network module 145, one USB module 150, one audio module 155, one PCI module 160, and one storage module 165 are shown, any number of processor modules 105, cache modules 110, memory modules 115, north bridge modules 120, south bridge modules 125, graphics modules 130, display modules 135, BIOS modules 140, network modules 145, USB modules 150, audio modules 155, PCI modules 160, and storage modules 165 may be employed.

The processor module 105, cache module 110, memory module 115, north bridge module 120, south bridge module 125, graphics module 130, display module 135, BIOS module 140, network module 145, USB module 150, audio module 155, PCI module 160, and storage module 165, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 115 stores software instructions. The memory module 115 may include a volatile memory such as a Dynamic Random Access Memory (DRAM), a non-volatile memory, or the like. The processor module 105 executes one or more computer program products. The processor module 105 may communicate over an integrated circuit (IC) processor bus for example, of two Gigahertz (2 GHz) or the like.

Computer program products may be tangibly stored in the storage module 165. The storage module 165 may communicate with the south bridge module 125 to store or access stored computer program products. The storage module 165 may be a hard disk drive, an optical storage device, a holographic storage device, a micromechanical storage device, a semiconductor storage device, or the like. The computer program products tangibly stored in the storage module 165 include an input/output (I/O) module, a topology display module, a relationship display module, and a toolbar module as will be discussed hereafter.

The processor module 105 of the computer 100 may communicate with the cache module 110 through a processor interface bus to reduce the average time to access memory module 115. The cache module 110 may store copies of the data from the most frequently used storage module 165 locations. The cache module 110 may be controlled by the microcontroller in the storage module 165. The microcontroller may be a single IC and may have sufficient memory and interfaces needed for an application. The computer 100 may use one or more cache module 110 such as a DDR2 cache memory or the like.

The north bridge module 120 may communicate and hence may provide bridging functionality among the processor module 105, the graphic module 130 through a 16-lane PCI express bus, the memory module 115, and the cache module 110. The north bridge module 120 may be an IC or the like known to those skilled in the art. The processor module 105 may be connected to the north bridge module 120 over a, for example, six hundred sixty seven Megahertz (667 MHz) front side bus.

The north bridge module 120 may be connected to the south bridge module 125 through a direct media interface (DMI) bus. The DMI bus may provide a high-speed, bi-directional, point-to-point link supporting a clock rate for example of the value of one Gigabytes per second (1 GBps) in each direction between the north bridge module 120 and the south bridge module 125. The south bridge module 125 may support and communicate with the BIOS module 140, the network module 145, the USB module 150, the audio module 155, the PCI module 160, and the storage module 165. The south bridge module 125 may be an IC or the like known to those skilled in the art.

The south bridge module 125 may include an integrated USB controller. The south bridge module 125 may communicate with the USB module 150 through the USB controller. The USB controller may support any of the USB functions selected from, for example, bluetooth support, IR receivers, built-in insight cameras, built-in track pads, keyboards, expresscard/34 slots, plurality of external USB ports, mice sticks, joysticks, game pads, other low-bandwidth devices or the like.

The south bridge module 125 may communicate with the audio module 155 through an I/O device as is known to those of skill in the art. The audio module 155 may support a built-in microphone or a combination analog audio line-in and S/PDIF digital optical audio line-in jack or a combined analog output and S/PDIF digital optical audio line-out jack.

The PCI module 160 may communicate with the south bridge module 125 for transferring data or power to peripheral devices. The PCI module 160 may include a PCI bus for attaching the peripheral devices. The PCI bus can logically connect several peripheral devices over the same set of connections. The peripherals may be selected from a printer, a joystick, a scanner, or the like. The PCI module 160 may be an IC called a planar device fitted onto the motherboard of the computer 100. The PCI module 160 may also be an expansion card as is well known to those skilled in the art.

The BIOS module 140 may communicate instructions through the south bridge module 125 to boot the computer 100, so that software instructions stored on the memory module 115 can load, execute, and assume control of the computer 100. Alternatively, the BIOS module 140 may comprise a coded program embedded on a chipset that recognises and controls various devices that make up the computer 100.

The network module 145 may communicate with the south bridge module 125 to allow the computer 100 to communicate with other devices over a network. The devices may include routers, bridges, computers, printers, and the like.

The display module 135 may communicate with the graphic module 130 to display the topological display of the user interface elements as will be described hereafter. The display module 135 may be a cathode ray tube (CRT), a liquid crystal display (LCD) monitor, or the like.

Figure 2:
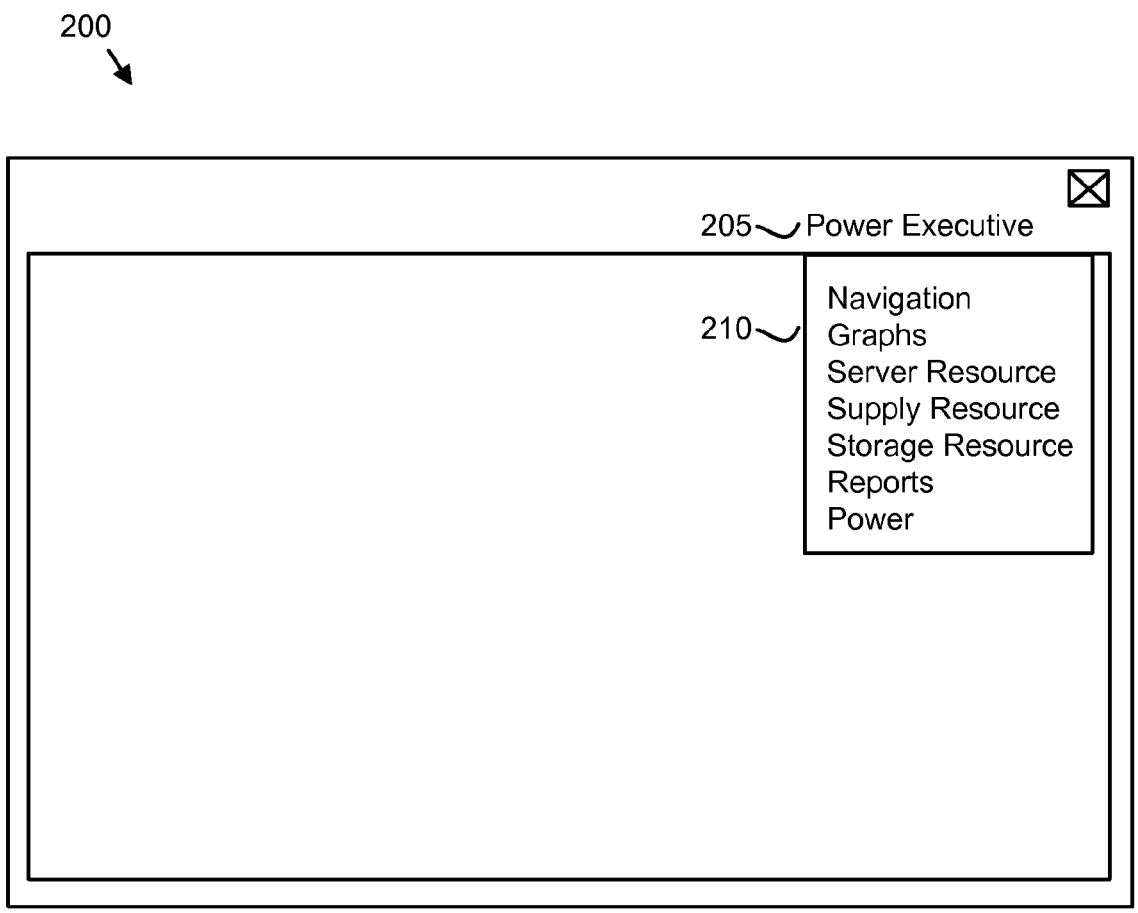
FIG. 2 is a drawing illustrating one embodiment of a system console of the present invention.

FIG. 2 is a drawing illustrating one embodiment of a system console 200 of the present invention. The system console 200 includes a menu bar 205. The menu bar 205 further expands to a task bar 210.

In the shown embodiment, the menu bar 205 includes a power executive UIE. The menu bar 205 further expands and displays tasks that could be carried on by a user using the power executive UIE. The tasks include navigation, graphs, server resource, supply resource, shortage resource, reports, and power, although one of skill in the art will recognize that any number and type of tasks may be supported. In one example, the user may generate graphs showing system parameters by selecting the graph task of the task bar 210.

Figure 3:
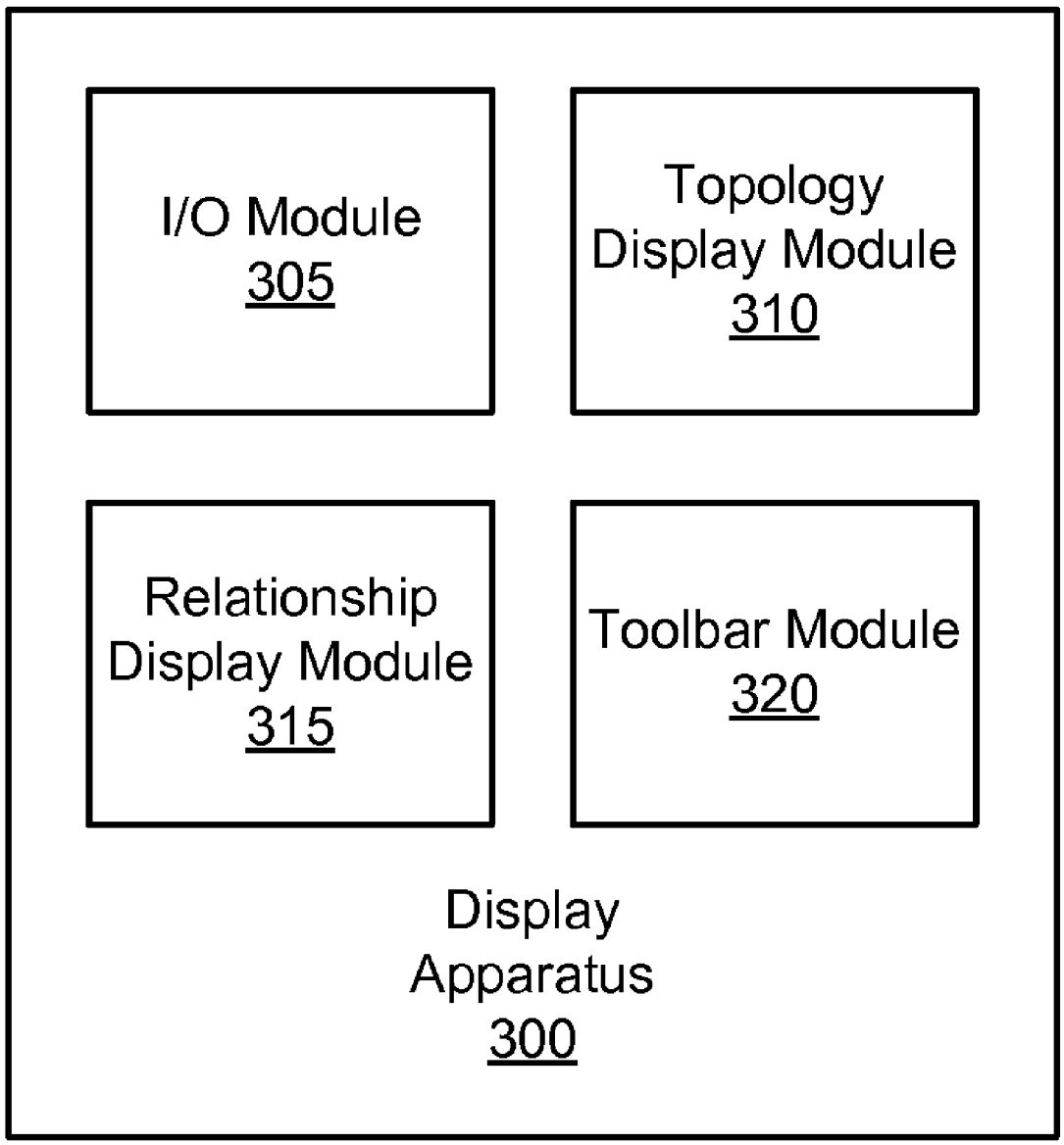
FIG. 3 is a schematic block diagram illustrating one embodiment of a topological display apparatus of the present invention.
Figure 4:
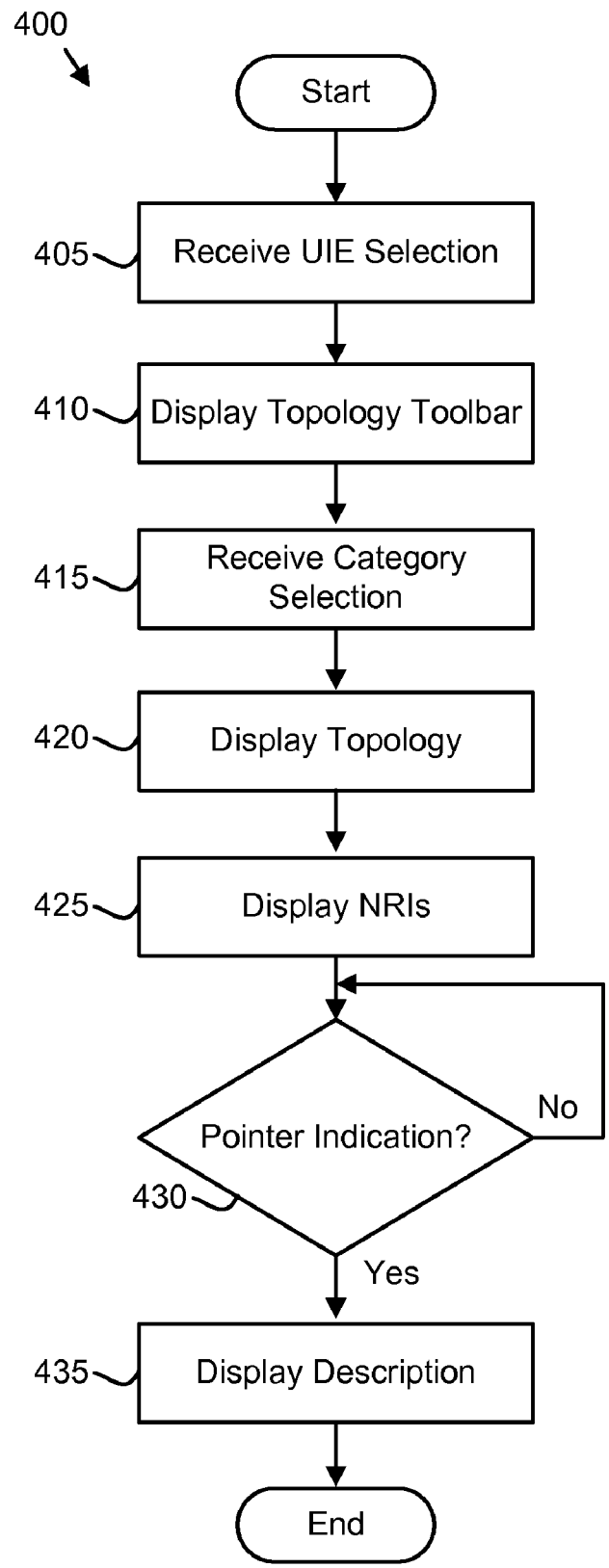
FIG. 4 is a schematic flow chart diagram illustrating one embodiment of a method for topological display of the present invention.

FIG. 3 is a schematic block diagram illustrating one embodiment of a topological display apparatus 300 of the present invention. The apparatus 300 enables topological display of an UIE and can be embodied in the computer 100 of the FIG. 1. The description of apparatus 300 refers to elements of FIGS. 1 and 2, like numbers referring to like elements. The apparatus 300 includes an I/O module 305, a topology display module 310, and a relationship display module 315. Further, the apparatus 300 may include a toolbar module 320.

The I/O module 305 receives a selection of a UIE. The UIE may be a button, a check box, a list box, a drop-down list, a radio button, a menu bar, a tool/task bar, a ribbon, a combo box (text box with attached menu or list box), an icon, a navigation tree, a grid, a tab bar or a scrollbar for navigation, a text input to edit field and a combo box in the form of text box with attached menu for input of text, a label, a tooltip, a balloon help, a status bar, and a progress bar for output, a modal window, a dialog box window, a utility window, an inspector window or the like. For example, the I/O module 305 may receive the selection of the power executive of the menu bar 205 of the system console 200 as the UIE when the user right clicks on the power executive of the menu bar 205 and/or the user selects an automated topological display option.

Further, in an embodiment, the I/O module 305 receives a selection of at least one UIE category. The UIE category may be a category of UIEs with new functionality, a category of UIEs with modified functionality, and/or a category of UIEs with no modified and new functionality, which are referred to herein as existing functionality. The modified functionality may comprise plug-in functions, upgraded functions, and/or a new version of functions as is known to those skilled in the art. For example, I/O module 305 may receive the selection of the power executive of the menu bar 205 of the system console 200 in the category of UIEs with no new functionality. The I/O module 305 may be a computer readable program and may be executed on the processor module 105. The plug-in functions, the new version of functions, and the upgraded functions may also be computer readable programs and may be executed on the processor module 105 by a host operating system.

The topology display module 310 displays a topology view of the selected UIE and child UIEs of the selected UIE. The child UIEs may be UIEs such as tasks/tools, resources or the like that are linked to the selected UIE and/or to other UIEs. For example, tasks such as navigation, graphs, server resource, supply resource, shortage resource, reports, and power may be the child UIEs that are linked to the power executive that is selected as the UIE of the menu bar 205 of the system console 200.

The topology view of the selected UIE and child UIEs of the selected UIE may be a graphical view, a tabular view, and/or the like. For example, the topology display module 310 may display the topology view of the power executive that is selected as the UIE of the menu bar 205 of the system console 200 and the corresponding child UIEs such as navigation, graphs, server resource, supply resource, shortage resource, reports, and power in the form of the tabular view when the user right clicks on the power executive and selects an automated topological display option and/or selects a topological display option on the menu bar 205. The tabular view may be the graphical representation showing the power executive UIE as text element in a row of a table and the corresponding child UIEs such as navigation, graphs, server resource, supply resource, shortage resource, reports, and power as text elements in one (1) column and nine (9) rows one by one from top to bottom of the table.

Further, in an embodiment, the topology display module 310 displays the topology view of the selected UIE with the child UIEs of the selected UIE that satisfy at least one selected category. For example, the topology display module 310 may display the topology view of the selected power executive UIE of the menu bar 205 of the system console 200 with the child UIEs such as navigation, graphs, server resource, supply resource, shortage resource, and reports since these may fall in the category of UIEs with existing functionality.

In one more embodiment, the topology display module 310 displays a navigation tree of UIEs as will be described hereafter. The navigation tree may be a graphical representation showing the selected UIE, for instance, the power executive of the menu bar 205 of the system console 200 linked with the child UIEs, for instance, such as navigation, graphs, server resource, supply resource, shortage resource, reports, and power. The topology display module 310 may further display links in the form of branches to any or all the child UIEs.

Additionally, the topology display module 310 may display an indicator adjacent to each modified UIE. The indicator may comprise an image selected from scaled images and icons. The images and the icons may include shapes of various objects or the like. For example, the topology display module 310 may display the indicator in the form of the icon with the shape of a computer adjacent to the power executive selected as the UIE of the UIEs of modified functionality of the menu bar 205 of the system console 200. Alternatively, the indicator may comprise a text element. The text element may include appropriate text element in the form of labels for each UIE. For example, the topology display module 310 may display the indicator in the form of text element such as "reports" adjacent to the modified functionality of the menu bar 205 of the system console 200. Each indicator may communicate a status using a color, intermittent flashing, and the like.

In one embodiment, the topology display module 310 displays menus and functional elements for menu items. For example, the topology display module 310 may display options for a "graph" menu item.

Further, in an embodiment, the topology display module 310 displays a list of related UIEs in response to pointer indication directed to the indicator. The pointer indication may be selected from a pointer selection and a pointer hover as is known to those skilled in the art. For example, when the user positions a pointer over the power executive UIE of the menu bar 205 of the system console 200, the topology display module 310 may display the list of related UIEs such as navigation, graphs, server resource, supply resource, shortage resource, reports, and power.

The toolbar module 320 may display a topology toolbar comprising a plurality of UIE categories. For example, the toolbar module 320 may display the topology toolbar comprising the UIE categories of modified functionality, new functionality, and existing functionality. The toolbar module 320 may be a computer program product and may be executed on the processor module 105.

The relationship display module 315 displays a modified NRI, a new NRI, and an existing NRI for each navigation relationship between UIEs. In a particular embodiment, each UIE includes an indicator showing modified functionality, new functionality, and existing functionality. The NRI may be a solid line, a hash line, or a highlighted line with a specified color.

In an embodiment, the modified functionality comprises plug-in functions. The plug-in functions may be a computer program product that may interact with a main or host application to provide a certain usually very specific function on-demand. In another embodiment, the modified functionality comprises upgraded functions. The upgraded functions may be computer program products. For example, the upgraded functions may be advanced version of the available program with the host application, for example, like program with improved failure prediction capabilities.

In one example, the relationship display module 315 may display the hashed line between one (1) UIE with no modified functionality and one (1) UIE with modified functionality. In another example, the relationship display module 315 may display the highlighted line with a red color as the new NRI between one (1) UIE without modified functionality and one (1) UIE with new functionality. In one example, the relationship display module 315 may display the solid line as the NRI between two (2) UIEs with existing functionality. The relationship display module 315 may be a computer program product and may be executed on the processor module 105.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The method 400 starts and in an embodiment the I/O module 305 receives 405 a selection of a UIE. For example, the I/O module 305 may receive 405 the selection of the power executive of the menu bar 205 of the system console 200 as the selected UIE when the user right clicks on the power executive menu bar 205 and selects an automated topological display option. Alternatively, the I/O module 305 may automatically receive 405 the selection of the power executive of the menu bar 205 of the system console 200 as the selected UIE when the user selects the automated topological display option from a menu and selects the power executive of the menu bar 205 of the system console 200 from a list of UIEs.

In one embodiment, the toolbar module 320 displays 410 a topology toolbar comprising a plurality of UIE categories. For example, topology toolbar may allow the user to select displaying NRIs and/or UIEs with modified functionality, the NRIs and/or UIEs with new functionality, the NRIs and/or UIEs with both modified and new functionality, and the NRIs and UIEs with existing functionality.

Further, the I/O module 305 may receive 415 a selection of at least one UIE category. The UIE category may be a category of UIEs with new functionality, a category of UIEs with modified functionality, and/or a category of UIEs with existing functionality. For example, I/O module 305 may receive 415 the selection of UIEs with modified functionality from the topology toolbar.

The topology display module 310 displays 420 a topology view of the selected UIE and child UIEs of the selected UIE. Further, in an embodiment, the topology display module 310 displays 420 the topology view of the selected UIE with the child UIEs of the selected UIE that satisfy at least one selected category. For example, if the tasks such as reports and power of the menu bar 205 include modified functionality, the topology display module 310 may automatically display 420 the topology view of the power executive of the menu bar 205 and the reports and the power tasks if the user selects 415 the category of modified functionality from the topology toolbar. The tasks such as navigation, graphs, server resource, supply resource, and shortage resource tasks may be omitted as these tasks have neither new nor modified functionality.

In an embodiment, the topology display module 310 displays 420 a topology view as a navigation tree of UIEs. The navigation tree may be a graphical representation showing the selected UIE as will be shown hereafter.

The relationship display module 315 displays 425 a modified NRI, a new NRI, and an existing NRI for each navigation relationship between the UIEs. Any of the UIE in a navigation relationship may comprise modified functionality, new functionality, and existing functionality. The NRI may show the new and/or modified functionality of the UIE. The NRI may be solid line for navigation relationships where one UIE has modified functionality. In an example, the relationship display module 315 may display 425 a solid line NRI between the power executive UIE and a menu to indicate the modified functionality of elements of the menu. The relationship display module 315 may also render NRI using a plurality of patterns, colors, display periods, and the like to indicate the relationship between UIEs with new and/or modified functionality.

Further, the topology display module 310 determines 430 if a pointer indication is directed to an indicator such as a NRI and/or an UIE. For example, the topology display module 310 may determine 430 if the user directs the pointer indication to the power executive UIE of the menu bar 205 by hovering a cursor over the power executive UIE of the menu bar 205.

If the topology display module 310 determines 430 that there is no pointer indication directed to an indicator such as a NRI and/or an UIE, the method 400 loops to step 430. If the topology display module 310 determines 430 that there is pointer indication directed to the indicator, the topology display module 310 may display a list of related UIEs and the method 400 terminates. For example, when the user directs a pointer indication in the form of a pointer hover towards the power executive UIE of the menu bar 205 of the system console 200, the topology display module 310 may display 435 the list of related UIEs that navigate to and/or from the power executive UIE. The method 400 highlights new and/or modified functionality, allowing the user to easily identify new and/or modified features, tasks, menus, and the like.

Figure 5:
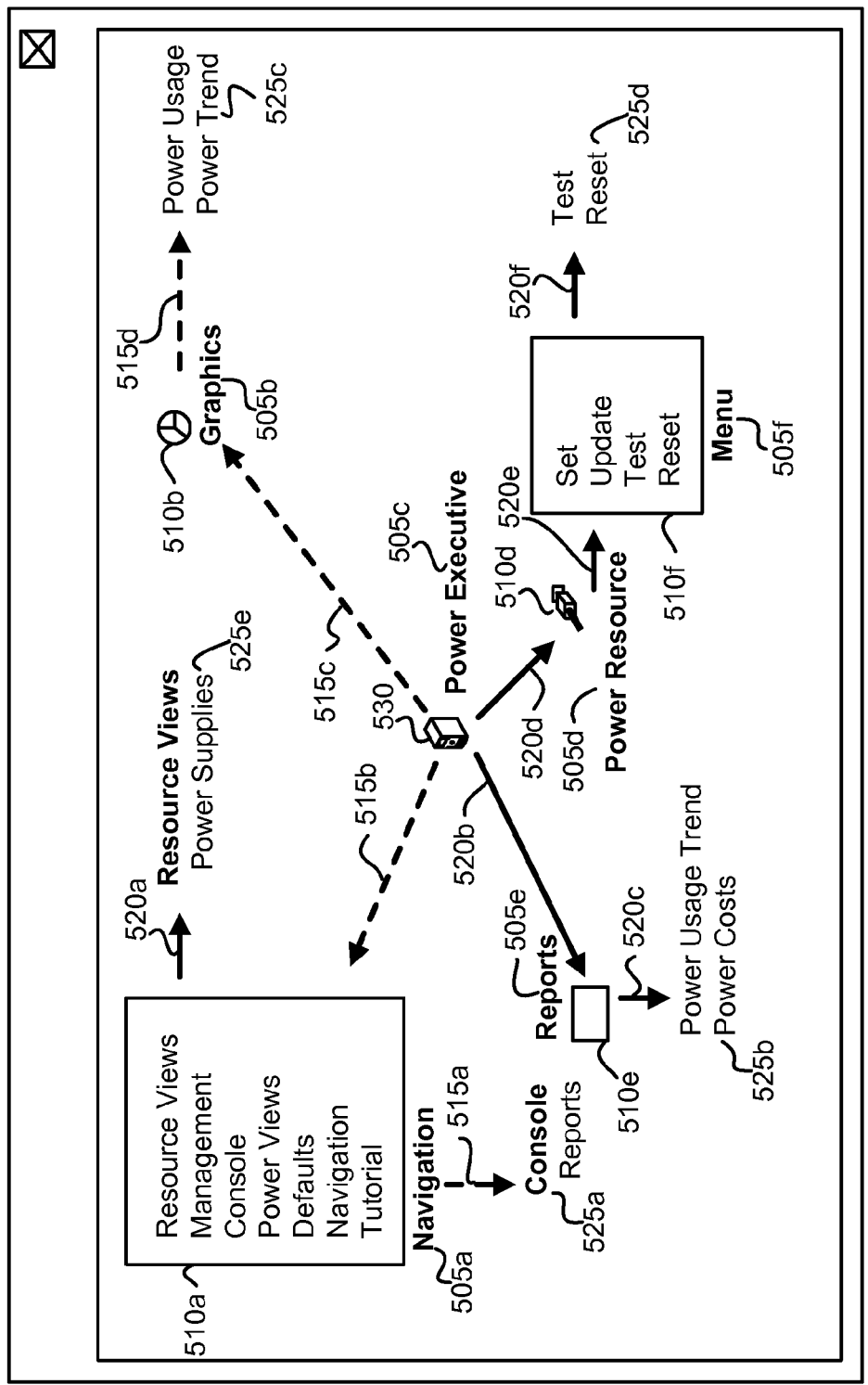
FIG. 5 is a drawing illustrating one embodiment of a topological display of the present invention.

FIG. 5 is a drawing illustrating one embodiment of a topological display 500 of the present invention. The description of display 500 refers to elements of FIGS. 1-4, like numbers referring to the like elements. The topological display 500 includes a plurality of UIE labels 505, a selected UIE 530, a plurality of the child UIEs 510 (a, b, d, e, f) in the form of an icon and/or a table, a plurality of the sub-child UIEs 525 (a, b, c, d, e), a plurality of modified NRIs 515, and a plurality of existing NRIs 520 (a, b, c, d, e, f). The sub-child UIEs 525 may be as text elements. The selected UIE 530, child UIEs 510, and sub-child UIEs 525 may be collectively referred to as UIEs. In the depicted embodiment, the NRIs 515 employ a hashed line to show navigation relationship between the two (2) or more UIEs, wherein at least one (1) of these UIEs comprises new/modified functionality, and the NRIs 520 employ a solid line to show navigation relationship between the two (2) or more UIEs with existing functionality.

In an embodiment, the topological display 500 displays the selected UIE 530 in the form of the icon of the shape of a computer accompanied with a third UIE label 505c stating "power executive." The selected UIE 530 is shown linked by the third modified NRI 515c in the form of the hashed line to the second child UIE 510b. The second child UIE 510b is represented in the form of the icon of the shape of a pie-graph accompanied with second UIE label 505b stating "graphics." The second child UIE 510b is further shown linked by a fourth modified NRI 515d in the form of the hashed line to the sub-child UIEs 525c of power usage and power trend. The sub-child UIEs 525c are shown as text elements. The second child UIE 510b may have new/modified functionality, causing the third modified NRI 515c to show new/modified functionality. In one embodiment, a modified NRI 515 may show new/modified functionality if a child UIE 510 has new and/or modified functionality. Thus the second UIE 510b may have new/modified functionality, causing the third modified NRI 515c to show new/modified functionality for the selected UIE 530.

The display 500 further shows the selected UIE 530 linked by the second modified NRI 515b in the form of the hashed line to the first child UIE 510a. The first child UIE 510a is shown as the table of one (1) column and seven (7) rows. The table is shown with first UIE label 505a stating "navigation." The text elements of the rows of the table from top to bottom state "resource views", "management", "console", "power views", "defaults", "navigation", and "tutorial" respectively corresponding to tasks of the task bar 210. The first child UIE 510a may have new/modified functionality, causing the second modified NRI 515b to show new/modified functionality for the selected UIE 530.

In the depicted embodiment, the first child UIE 510a is shown linked by the first modified NRI 515a in the form of the hashed line to the first sub-child UIEs 525a of console and reports. The first sub-child UIE 525a is shown as text elements. The first child UIE 510a may have new/modified functionality, causing the first modified NRI 515a to show new/modified functionality.

Further, the first child UIE 510a is shown linked by the first existing NRI 520a in the form of the solid line to the fifth sub-child UIEs 525e of resource views and power supplies. The fifth sub-child UIE 525e is shown as text elements. Although the first child UIE 510a may have new/modified functionality, the first existing NRI 520a may indicate that there is existing functionality for the fifth sub-child UIE 525e.

The display 500 further displays the selected UIE 530 linked by the second existing NRI 520b in the form of the solid line to the fifth child UIE 510e. The fifth child UIE 510e is represented in the form of the icon of the shape of a rectangle accompanied with the fifth UIE label 505e "reports." The fifth child UIE 510e is further shown linked by the third existing NRI 520c in the form of the solid line to the second sub-child UIE 525b of power usage trend and power costs. The second sub-child UIEs 525b is shown as text elements. The second child UIE 510b may have existing functionality, causing the third existing NRI 520c to show no new/modified functionality.

The display 500 further displays the selected UIE 530 linked by the fourth existing NRI 520d in the form of the solid line to the fourth child UIE 510d. The fourth child UIE 510d is represented in the form of the icon of the shape of a power cable with a connecter accompanied with the fourth UIE label 505d "power resource." The fourth child UIE 510d is further shown linked by the fifth existing NRI 520e in the form of the solid line to the sixth child UIE 510f accompanied with the sixth UIE label 505f "menu." The sixth child UIE 510f is shown as the table of one (1) column and two (2) rows. The text elements of the rows of the table from top to bottom state "set," update," "test," and "reset" respectively. The sixth child UIE 510f is further shown linked with the help of the sixth existing NRI 520f in the form of the solid line to the fourth sub-child UIE 525d of test reset. The fourth sub-child UIE 525d is shown as text element. The fourth and sixth existing NRI 520d and NRI 520f may indicate that the fourth child UIE 510d and the sixth child UIE 510f may have existing functionality.

The exemplary display 500 allows the user to easily identify the UIEs with new and modified functionality that are available from the power executive UIE of the menu bar 205 of the system console 200. Thus the present invention facilitates the user making use of functionality added with add-ins, upgrades, and the like.

Figure 6:
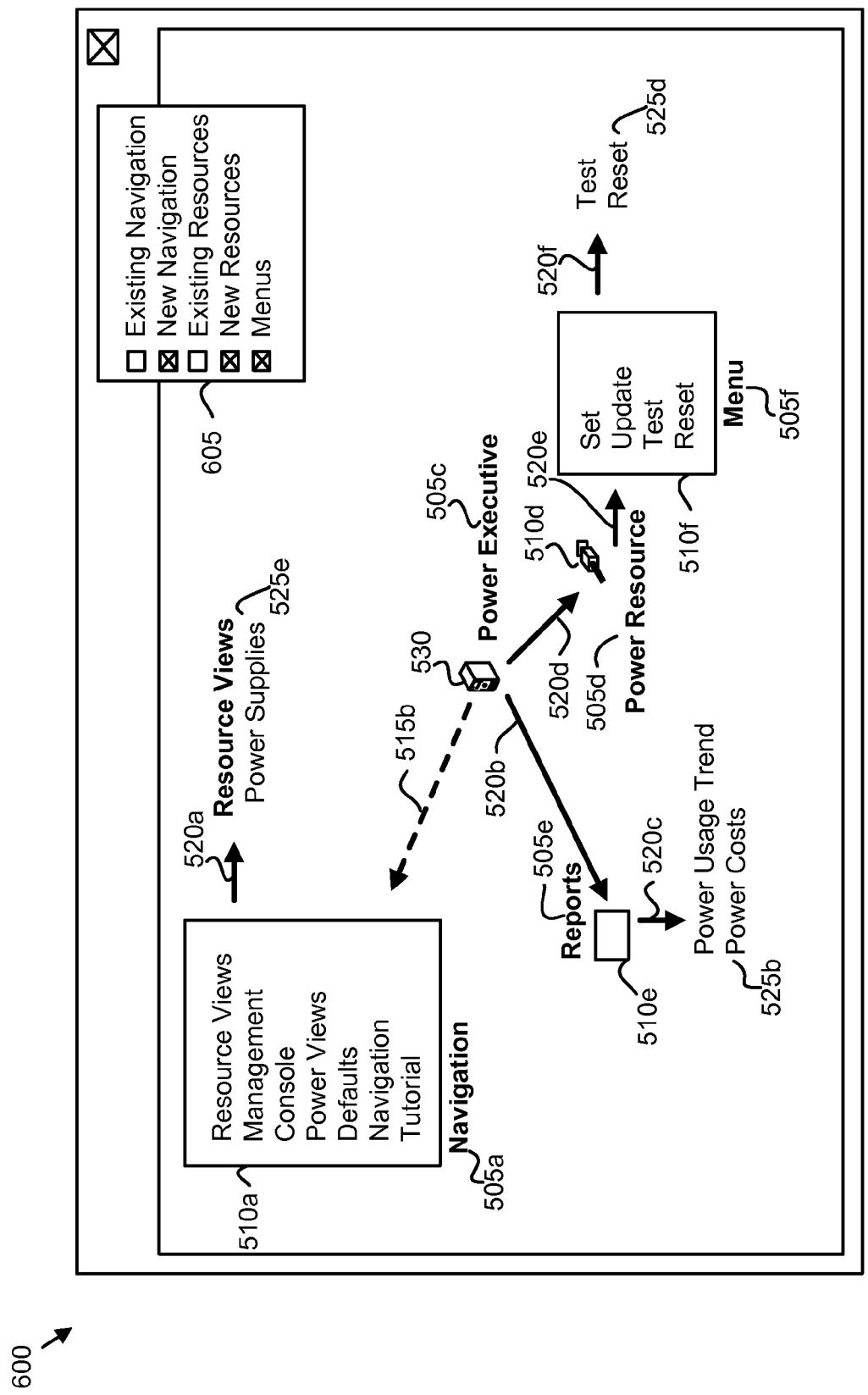
FIG. 6 is a drawing illustrating one alternate embodiment of a topological display of the present invention.

FIG. 6 is a drawing illustrating one alternate embodiment of a topological display 600 of the present invention. The description of display 600 refers to elements of FIGS. 1-5, like numbers referring to the like elements. The topological display 600 shows the display 500 of FIG. 5 and a topology toolbar 605. The display 600 represents the UIEs for the power executive of the menu bar 205 after the user accesses a topology toolbar 605 and selects at least one (1) UIE category.

The topology toolbar 605 is shown in a tabular form with one (1) column and five (5) rows. Each row of the table starting from top to bottom represents the UIE category such as "existing navigation," "new navigation," "existing resources," "new resources," and "menus." In an alternate embodiment, the topology toolbar 605 may be configured as a drop-down menu, icons, and the like. Each UIE category is accompanied with a selection box. In the depicted embodiment, the three (3) boxes for "new navigation," "new resources," and "menus" are shown selected by the user. The UIEs that fit the selected UIE categories are displayed. Thus the user can elect to only view new and/or modified functionality, further simplifying the identification of new and modified functionality as shown. Alternatively, the user may elect to view existing functionality in order to determine if a function is previously supported.

The present invention provides an apparatus, a system, and a method for topological display. Beneficially, such an apparatus, a system, and a method would allow topology viewers to display modified functionality for the management system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for topological display, the apparatus comprising:
    a storage device storing a computer readable program;
    a processor executing the computer readable program, the computer readable program comprising:
        an input/output (I/O) module receiving a selection of a user interface element (UIE);
        a topology display module displaying a topology view of the selected UIE and child UIEs of the selected UIE; and
        a relationship display module displaying navigation relationships between parent UIEs and child UIEs, the navigation relationships comprising a modified navigation relationship indicator (NRI) with a first appearance for each navigation relationship between UIEs wherein at least one UIE in the navigation relationship comprises modified functionality, the modified functionality comprising added plug-in functions and upgraded functions, a new NRI with a second appearance for each navigation relationship between UIEs wherein at least one UIE in the navigation relationship comprises new functionality, and an existing NRI with a third appearance for each navigation relationship between UIEs wherein no UIE in the navigation relationship comprises modified functionality and no UIE in the navigation relationship comprises new functionality.

2. The apparatus of claim 1, wherein the computer readable program: P1 further comprises a toolbar module displaying a topology toolbar comprising a plurality of UIE categories;
    the I/O module further receiving a selection of at least one UIE category;

the topology display module further displaying the topology view of the selected UIE with the child UIEs of the selected UIE that satisfy the at least one selected UIE category.

3. The apparatus of claim 1, the topology display module further displaying a navigation tree of UIEs, displaying an indicator adjacent to each modified UIE; and displaying a list of related UIEs in response to pointer indication directed to the indicator, the pointer indication selected from a pointer selection and a pointer hover.

4. The apparatus of claim 1, wherein the first appearance is a hashed line, the second appearance is a red line, and the third appearance is a solid line.

5. A computer program product comprising a computer useable storage medium having a computer readable program, wherein the computer readable program when executed on a computer causes the computer to:
   receive a selection of a UIE;
   display a topology view of the selected UIE and a child UIE of the selected UIE; and
   display navigation relationships between parent UIEs and child UIEs, the navigation relationships comprising a modified NRI with a first appearance for each navigation relationship between UIEs wherein at least one UIE in the navigation relationship comprises modified functionality, the modified functionality comprising added plug-in functions and upgraded functions, a new NRI with a second appearance for each navigation relationship between UIEs wherein at least one UIE in the navigation relationship comprises new functionality, and an existing NRI with a third appearance for each navigation relationship between UIEs wherein no UIE in the navigation relationship comprises modified functionality and no UIE in the navigation relationship comprises new functionality.

6. The computer program product of claim 5, wherein the computer readable program is further configured to cause the computer to:
   display a topology toolbar comprising a plurality of UIE categories;
   receive a selection of at least one UIE category;
   display the topology view of the selected UIE with the child UIEs of the selected UIE that satisfy the at least one selected UIE category.

7. The computer program product of claim 5, wherein the computer readable program is further configured to cause the computer to display an element indicator for each UIE.

8. The computer program product of claim 7, wherein the element indicator comprises an image selected from a scaled image and an icon.

9. The computer program product of claim 7, wherein the element indicator comprises text.

10. The computer program product of claim 5, wherein the computer readable program is further configured to cause the computer to display a description of a UIE in response to a pointer indication directed to the UIE, the pointer indication selected from a pointer selection and a pointer hover.

11. The computer program product of claim 5, wherein the computer readable program is further configured to cause the computer to display menu elements and corresponding functional components with modified functionality for each UIE representing a menu.

12. The computer program product of claim 5, wherein the new functionality comprises a new object.

13. The computer program product of claim 5, wherein the computer readable program is further configured to cause the computer to:
   display a navigation tree of UIEs;
   display an indicator adjacent to each modified UIE; and
   display a list of related UIEs in response to pointer indication directed to the indicator, the pointer indication selected from a pointer selection and a pointer hover.

14. The computer program product of claim 5, wherein the first appearance is a hashed line, the second appearance is a red line, and the third appearance is a solid line.

15. A method for deploying computer infrastructure, comprising integrating a computer readable program into a computing system, wherein the computer readable program executed by the computing system performs the following:
   receive a selection of a UIE;
   display a topology view of the selected UIE and a child UIE of the selected UIE;
   display navigation relationships between parent UIEs and child UIEs, the navigation relationships comprising a modified NRI with a first appearance for each navigation relationship between UIEs wherein at least one UIE in the navigation relationship comprises modified functionality, the modified functionality comprising added plug-in functions and upgraded functions, a new NRI with a second appearance for each navigation relationship between UIEs wherein at least one UIE in the navigation relationship comprises new functionality, and an existing NRI with a third appearance for each navigation relationship between UIEs wherein no UIE in the navigation relationship comprises modified functionality and no UIE in the navigation relationship comprises new functionality;
   display a topology toolbar comprising a plurality of UIE categories;
   receive a selection of at least one UIE category; and
   display the topology view of the selected UIE with the child UIEs of the selected UIE that satisfy the at least one selected UIE category.

16. The method of claim 15, wherein the method further comprises:
   displaying a navigation tree of UIEs;
   displaying an indicator adjacent to each modified UIE; and
   displaying a list of related UIEs in response to pointer indication directed to the indicator, the pointer indication selected from a pointer selection and a pointer hover.

17. The method of claim 15, wherein the first appearance is a hashed line, the second appearance is a red line, and the third appearance is a solid line.

* * * * *